(12) United States Patent
He et al.

(10) Patent No.: US 8,814,443 B2
(45) Date of Patent: Aug. 26, 2014

(54) CONNECTOR WITH IMPROVED FASTENING STRUCTURES FOR FASTENING TWO TONGUES THEREOF TOGETHER

(75) Inventors: Jia-Yong He, Kunshan (CN); Qi-Sheng Zheng, Kunshan (CN)

(73) Assignee: Hon Hai Precision Industry Co., Ltd., New Taipei (TW)

( * ) Notice: Subject to any disclaimer, the term of this patent is extended or adjusted under 35 U.S.C. 154(b) by 464 days.

(21) Appl. No.: 12/791,895

(22) Filed: Jun. 2, 2010

(65) Prior Publication Data

US 2010/0303421 A1    Dec. 2, 2010

(30) Foreign Application Priority Data

Jun. 2, 2009  (CN) .......................... 2009 1 0302825
Jun. 2, 2009  (CN) .......................... 2009 2 0303897

(51) Int. Cl.
  *G02B 6/38*   (2006.01)
  *G02B 6/30*   (2006.01)
  *H01R 33/00*  (2006.01)

(52) U.S. Cl.
  USPC ................. 385/75; 385/49; 385/73; 385/88; 385/89; 439/660

(58) Field of Classification Search
  None
  See application file for complete search history.

(56) References Cited

U.S. PATENT DOCUMENTS

| 5,259,052 | A * | 11/1993 | Briggs et al. ................ 385/78 |
| 5,419,717 | A * | 5/1995 | Abendschein et al. ....... 439/577 |
| 5,784,511 | A * | 7/1998 | Kikuchi et al. ................ 385/57 |
| 6,550,979 | B1 * | 4/2003 | Fleenor et al. ................ 385/78 |
| 2006/0120671 | A1 * | 6/2006 | Graham et al. ............... 385/75 |
| 2010/0158449 | A1 * | 6/2010 | Yi .................................. 385/75 |

FOREIGN PATENT DOCUMENTS

| CN | 201408857 Y | 2/2010 |
| JP | U3150303 | 5/2009 |
| TW | M312100 | 5/2007 |
| TW | M339101 | 8/2008 |

\* cited by examiner

*Primary Examiner* — Tina Wong
(74) *Attorney, Agent, or Firm* — Wei Te Chung; Ming Chieh Chang

(57) ABSTRACT

A connector defining a receiving space for receiving a corresponding plug, comprises a first housing, a second housing retained to the first housing along a back to front direction, and a plurality of contacts retained in the first housing and the second housing. The first housing has a first base and a first tongue forwardly extending into the receiving space. The second housing has a second tongue jointing with the first tongue along the back to front direction to form an integral tongue plate. The integral tongue plate has a volume which is same to that of the first tongue. A front end surface of the first tongue is located at front of a front end surface of the second tongue along a front to back direction.

20 Claims, 9 Drawing Sheets

CONNECTOR WITH IMPROVED FASTENING STRUCTURES FOR FASTENING TWO TONGUES THEREOF TOGETHER

BACKGROUND OF THE INVENTION

1. Field of the Invention

The present invention relates to connectors, more particularly to connectors with improved fastening structures for fastening two tongues thereof together.

2. Description of Related Art

A conventional electrical connector includes a first housing, a second housing, a first group of contacts retained on the first housing, a second group of contacts retained on the second housing and a metal shell covering the first and second housing. The metal shell defines a mating port for receiving a corresponding plug. The first housing has a first tongue extending into the mating port, and the second housing has a second tongue overlapped with each other along an up to down direction to form an integral tongue plate. The first tongue defines a plurality of first slots at an upper side thereof to receive the first group of contacts. The second tongue defines a plurality of second slots at a lower side thereof to receive the second group of contacts. The first housing has a receiving cavity below the first tongue and a pair of fastening slots at two outsides of the receiving cavity. The fastening slots extend along an up to down direction and communicate with the receiving cavity along a transverse direction. The second housing is assembled to the receiving cavity along the up to down direction. The second housing has a pair of blocks at two sides thereof to engage with the fastening slots. A front surface of the first tongue is coplanar with a front surface of the second tongue.

As described above, the second housing is fastened to the first housing via the fastening slot and the blocks for preventing the second housing from moving along a front to back direction. However, there are not any positioning structures to prevent the second housing from moving away from the first housing along the up to down direction. Therefore, the second housing easily disengages from the first housing along the up to down direction. Besides, the front surface of the first tongue is coplanar with that of the second housing, and the first and second tongues are only overlapped with each other, there are not any thing to joint them together. When the corresponding plug is inserted into the mating port to electrically connect with the first and second contacts on the first and second tongues, the plug would resist the front surfaces of all the first and second tongues at the same time, which easily make the first and second tongues be separated from each other, and can not connect with the plug stably.

Hence, an improved connector is desired to overcome the above problems.

BRIEF SUMMARY OF THE INVENTION

According to one aspect of the present invention, a connector defining a receiving space for receiving a corresponding plug, comprises: a first housing having a first base and a first tongue forwardly extending into the receiving space, the first tongue defining a cavity recessed from an upper surface thereof; a second housing having a second tongue retained to the cavity; a plurality of contacts retained on the second housing, the contacts having a plurality of first contacts and a plurality of second contacts retained at two sides of the second housing respectively, each first contact having an elastic first contact portion located at an upper side of the second tongue, each second contact having a flat second contact portion forwardly extending beyond the second tongue to be received in the recesses.

According to another aspect of the present invention, a connector defining a receiving space for receiving a corresponding plug, comprises: a first housing having a first base and a first tongue forwardly extending into the receiving space; a second housing retained to the first housing along a back to front direction, the second housing having a second tongue jointing with the first tongue along the back to front direction to form an integral tongue plate; and a plurality of contacts retained in the first housing and the second housing; wherein the integral tongue plate has a volume which is same to that of the first tongue, and a front end surface of the first tongue is located at front of a front end surface of the second tongue along a front to back direction.

The foregoing has outlined rather broadly the features and technical advantages of the present invention in order that the detailed description of the invention that follows may be better understood. Additional features and advantages of the invention will be described hereinafter which form the subject of the claims of the invention.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION OF THE PREFERRED EMBODIMENTS

Figure 1:
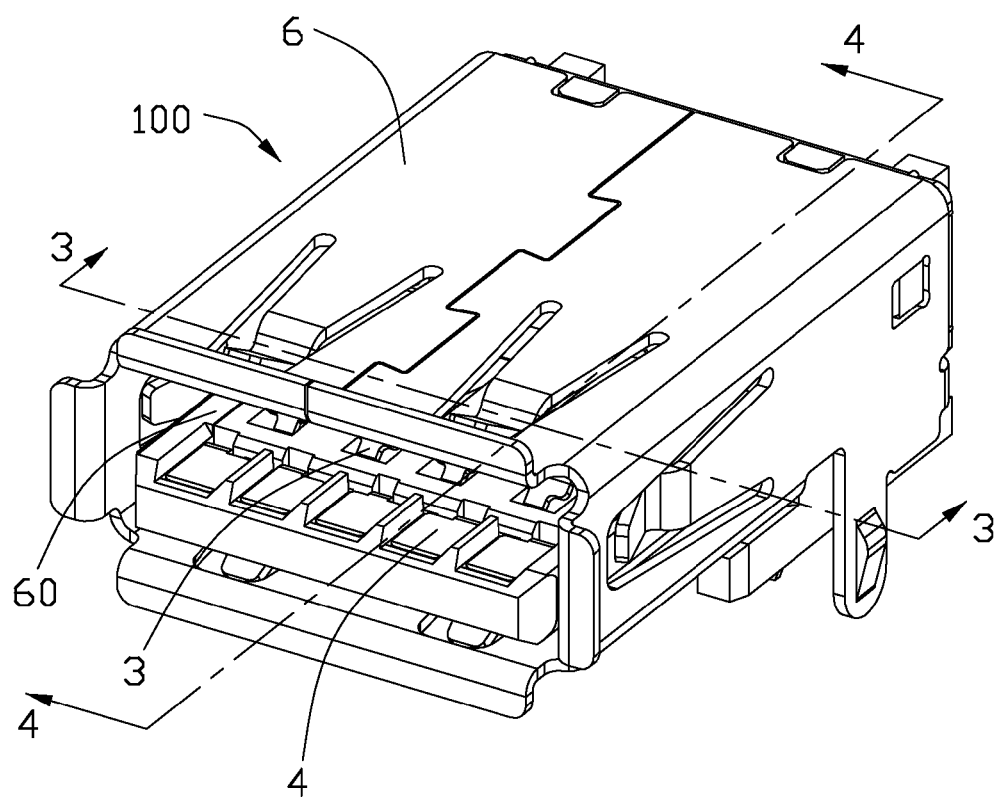
FIG. 1 is a perspective view of a connector according to the present invention.

In the following description, numerous specific details are set forth to provide a thorough understanding of the present invention. However, it will be obvious to those skilled in the art that the present invention may be practiced without such specific details. In other instances, well-known circuits have been shown in block diagram form in order not to obscure the present invention in unnecessary detail. For the most part, details concerning timing considerations and the like have been omitted inasmuch as such details are not necessary to obtain a complete understanding of the present invention and are within the skills of persons of ordinary skill in the relevant art.

Reference will be made to the drawing figures to describe the present invention in detail, wherein depicted elements are not necessarily shown to scale and wherein like or similar elements are designated by same or similar reference numeral through the several views and same or similar terminology.

Figure 2:
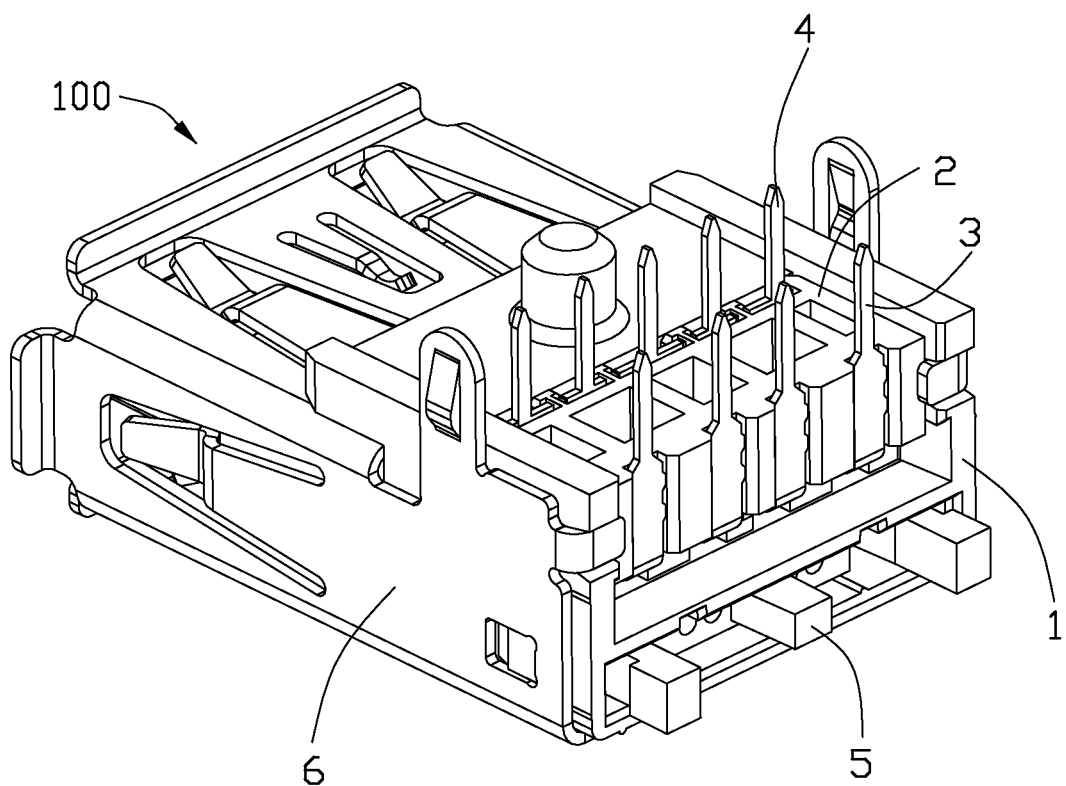
FIG. 2 is a view similar to FIG. 1, while taken from a different aspect.
Figure 3:
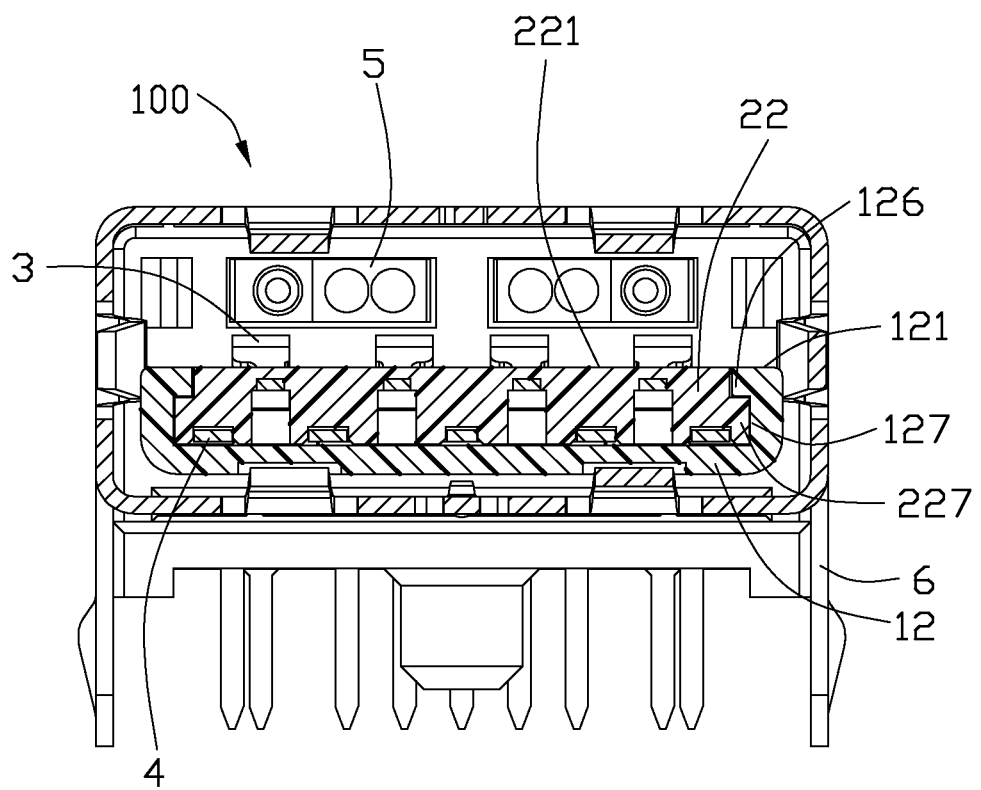
FIG. 3 is a cross-sectional view taken along line 3-3 of FIG. 1.
Figure 4:
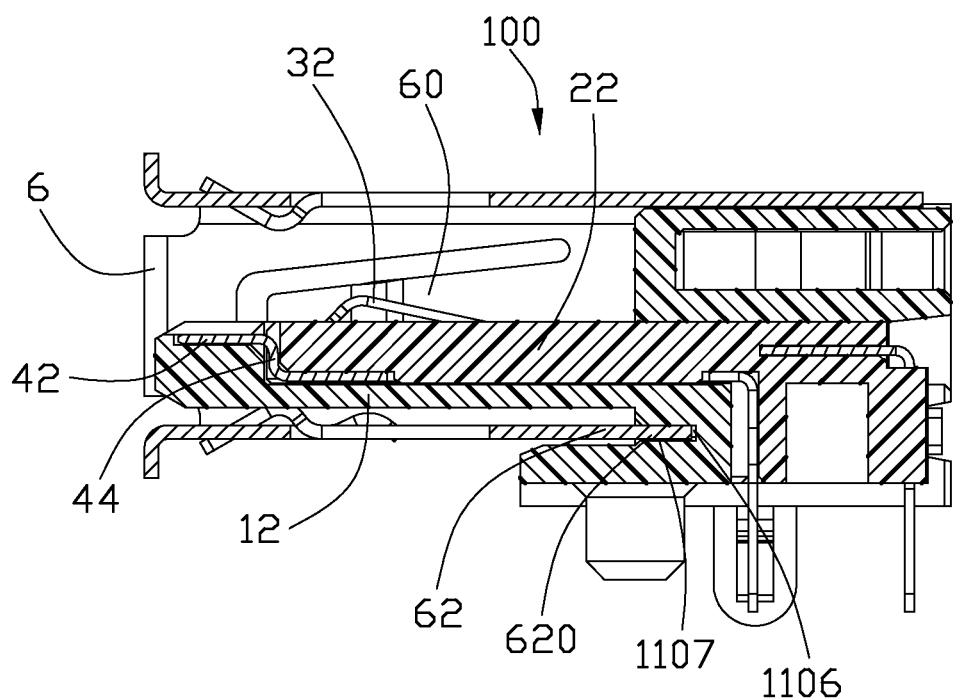
FIG. 4 is a cross-sectional view taken along line 4-4 of FIG. 1.
Figure 5:
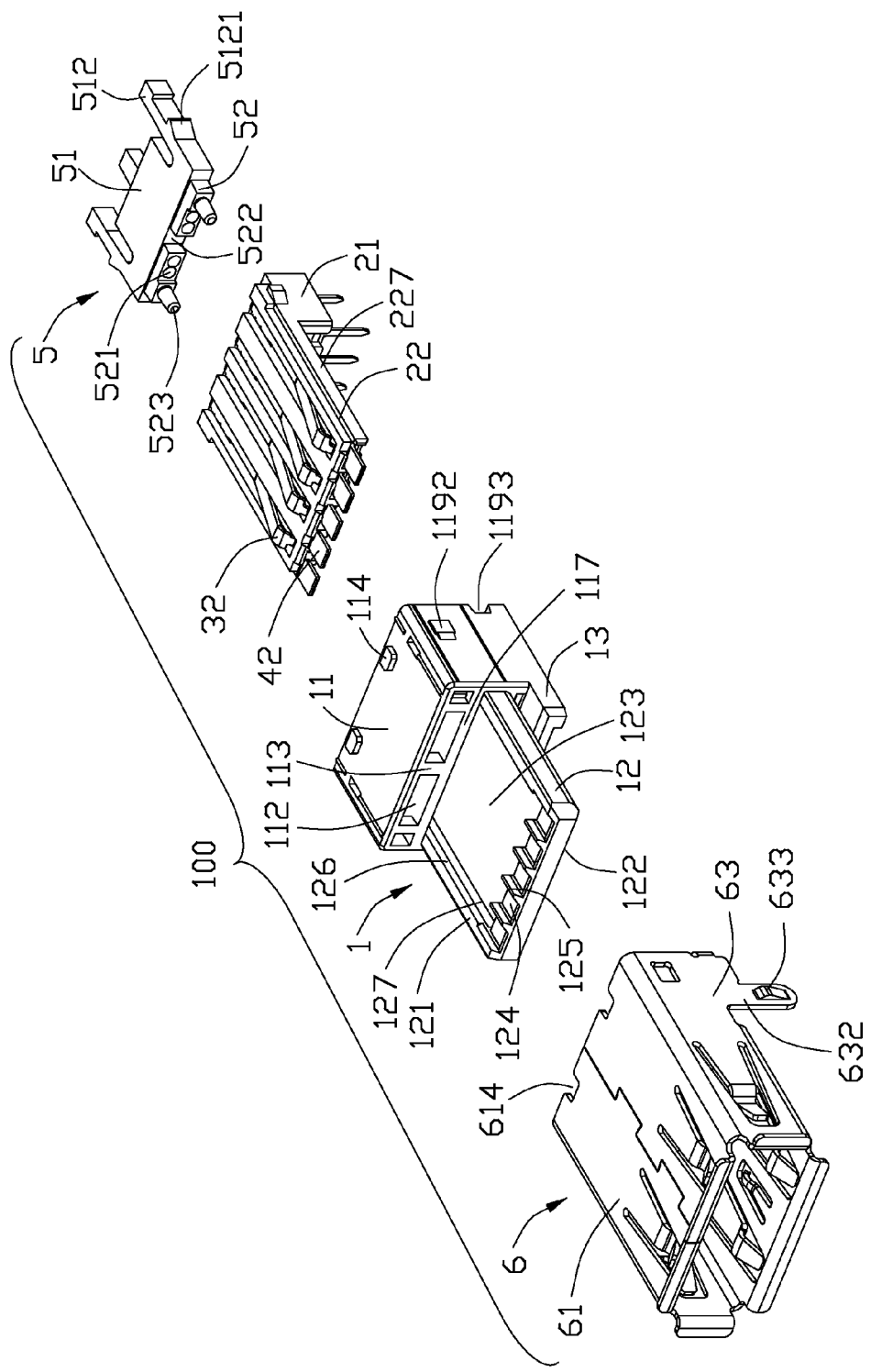
FIG. 5 is a partially exploded view of the connector shown in the FIG. 1.
Figure 6:
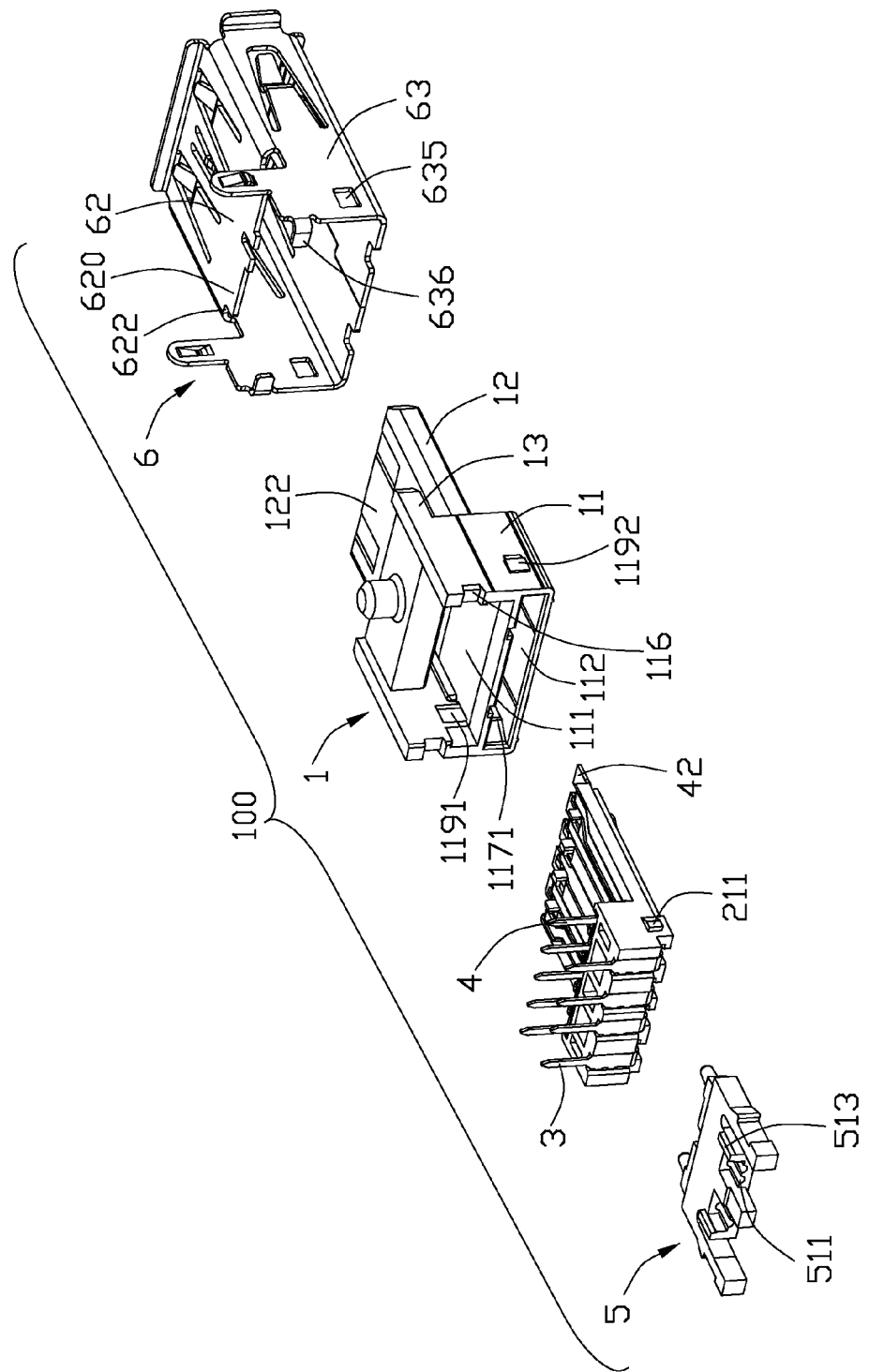
FIG. 6 is a view similar to FIG. 5, while taken from a different aspect.
Figure 7:
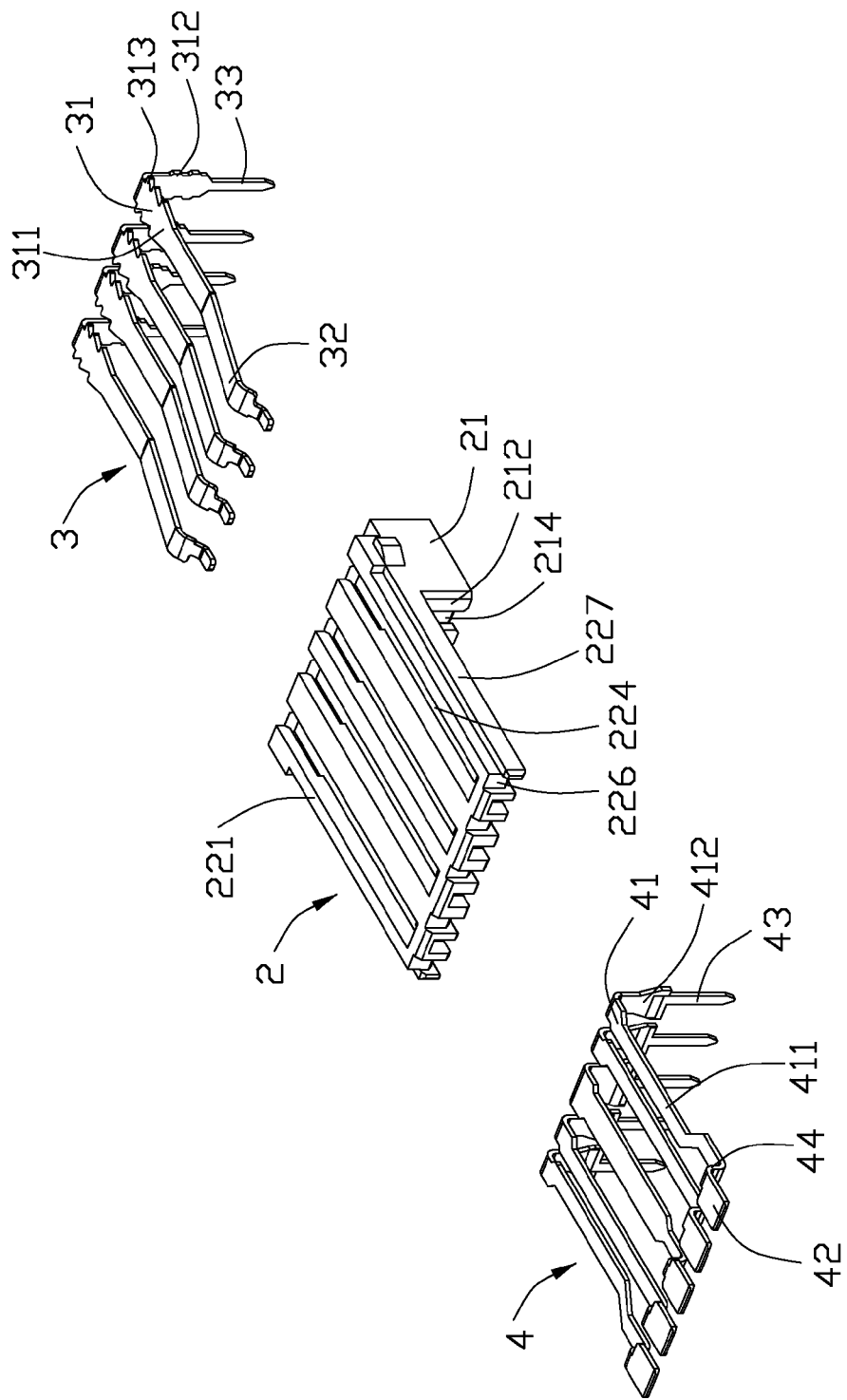
FIG. 7 is an exploded view of a second housing and a plurality of contacts shown in the FIG. 5.
Figure 8:
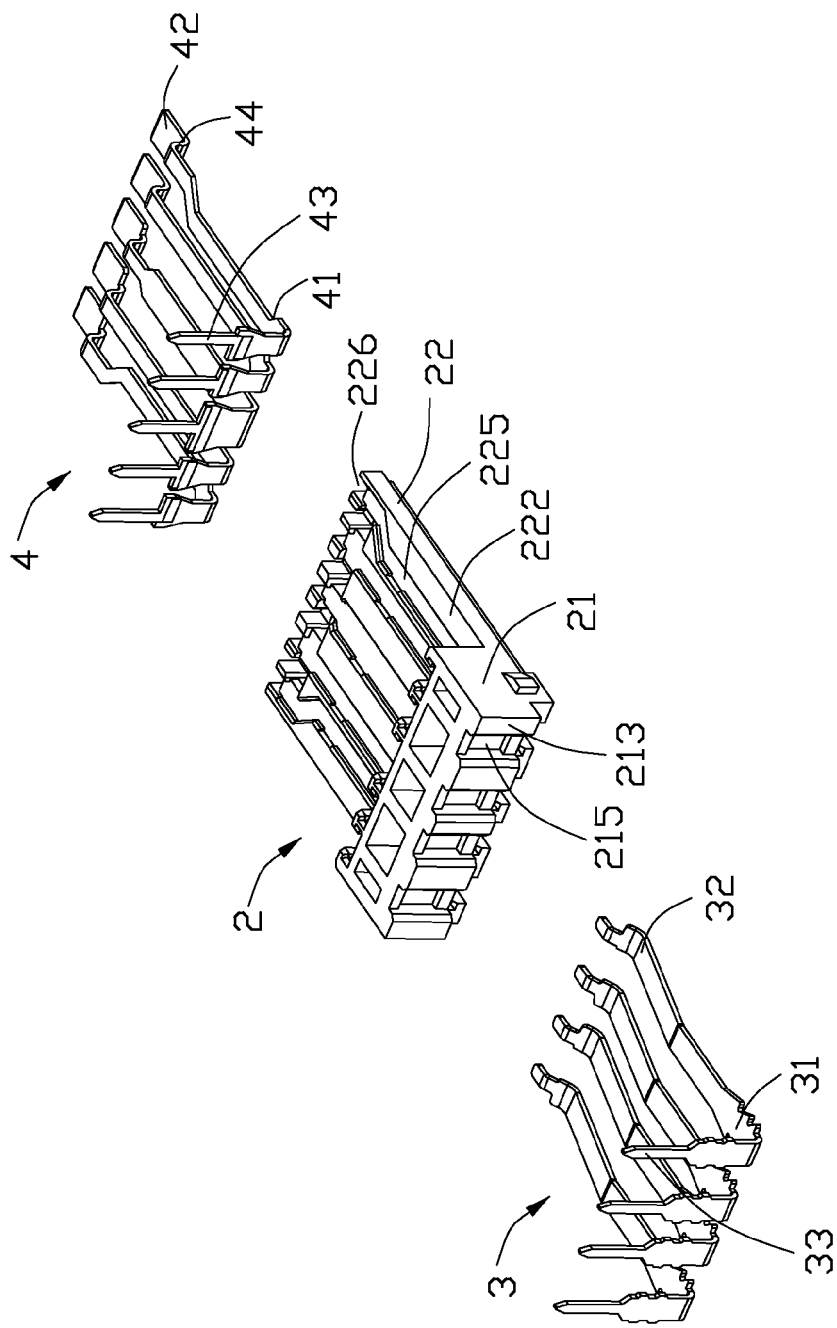
FIG. 8 is a view similar to FIG. 7, while taken from a different aspect.
Figure 9:
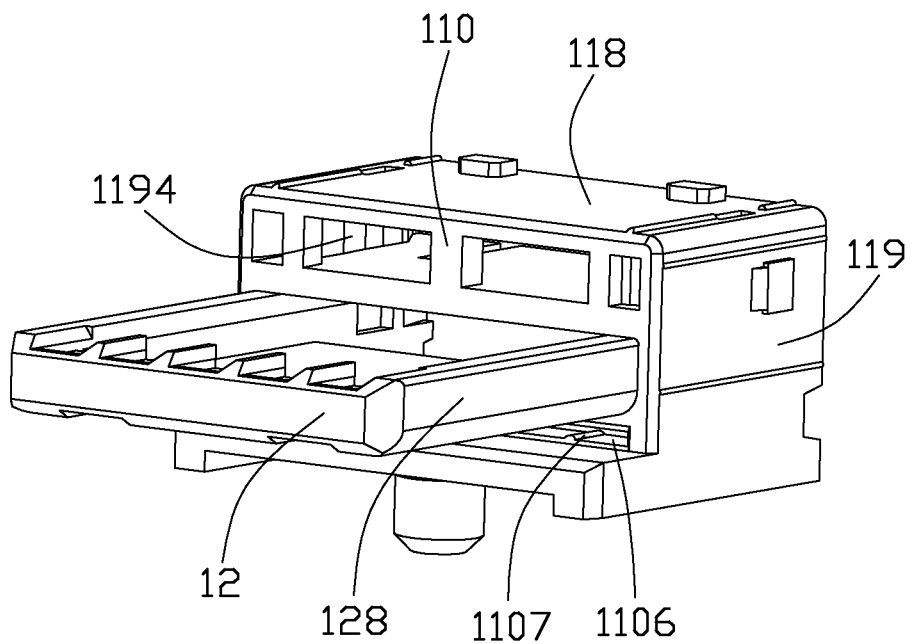
FIG. 9 is a perspective view of a first housing shown in FIG. 5.

Referring to FIGS. 1-9, a connector 100 for soldering to a circuit board (not shown) according to the present invention is disclosed. The connector 100 is an optical/electrical connector and can mate with an optical plug, a standard USB 2.0 plug or a standard USB 3.0 plug (not shown). The connector 100 comprises a first housing 1, a second housing 2 retained on the first housing 1, a plurality of contacts retained on the second housing 2, an optical module 5 retained in the first housing 1, and a metal shell 6 covering the insulative housing 1. The connector 100 defines a receiving space 60 for receiving a corresponding plug. The contacts comprise a plurality of first contacts 3 retained on an upper side of the second housing 2 and a plurality of second contacts 4 retained on a lower side of the second housing 2.

Referring to FIGS. 3-6 and 9, the first housing 1 has a first base 11, a first tongue 12 and an assistant board 13 extending forwardly from a middle side and a lower end of a front surface 110 of the first base 11. The first tongue 12 is parallel to the assistant board 13 and longer than the assistant board 13 along a front to back direction. The first base 11 has a top wall 118 and a pair of side walls 119 at two sides thereof.

The first tongue 12 has a first upper surface 121, a first bottom surface 122, and a pair of side surface 128 at two sides thereof. A plurality of recesses 124 are recessed from a front edge of the first upper surface 121 and extend forwardly through the front end of the first tongue 12. The first tongue 12 is formed with a plurality of ribs 125 between adjacent two recesses 124 and a cavity 123 behind the recesses 124. The ribs 125 have a top surface which is coplanar with the first upper surface 121 of the first tongue 12. The cavity 123 communicates with the recesses 124 along a back to front direction, and defines a lower inner wall which is lower than that of the recesses 124 along an up to down direction. The first tongue 12 is formed with a pair of resisting walls 126 extending toward the cavity 123 from the side surface 128 to form a pair of accumbent U-shape grooves 127 at two sides of the cavity 123. The resisting wall 126 is located behind the recesses 123 and defines a length which is equal to that of the cavity 123 along a front to back direction which is opposite to the back to front direction.

The cavity 123 rearwardly extends through the first base 11, thereby the first base 11 is formed with a first retaining room 111 behind the cavity 123 and communicating with the cavity 123 along the front to back direction for retaining the second housing 2. The first base 11 further defines a second retaining room 112 extending therethrough along the front to back direction and located at an upper side of the first retaining room 111. The first base 11 is formed with a partition board 117 extending horizontally between the first and second retaining room 111, 112 to separate the first and second retaining room 111, 112 from each other along the up to down direction. Therefore, the first retaining room 111 is formed between the partition board 117, two side walls 118 of the first base 11 and a lower inner wall thereof. The second retaining room 112 is formed between the partition board 117, the top wall 119 and two side walls 118 of the first base 11 for retaining the optical module 5. The first base 11 has a stopping portion 113 at a front middle position of the second retaining room 112. The stopping portion 113 extends vertically for preventing the optical module 5 from moving forwardly. The partition board 117 defines a pair of tracks 1171 recessed from a top surface thereof. The tracks 1171 communicate with the second retaining room 112 and extend along the front to back direction for guiding the optical module 5 to be inserted into the second retaining room 112.

Each side wall 119 defines a fastening recess 1191 recessed from an inner side thereof and communicating with the first retaining room 111 along a transverse direction of the first housing 11, a protrusion 1192 protruding outwardly to lock with the metal shell 6, and a pair of cutouts 1193 recessed from a rear end thereof to engage with the metal shell 6. The top wall 118 has a pair of projections 114 projecting upwardly to engage with the metal shell 6. The side walls 119 also has a plurality of clasp portions 1194 extending into the second retaining room 112 for retaining the optical module 5. The first base 11 further defines a receiving slot 1106 recessed from a lower side of the front surface 110 and a slim protruding portion 1107 protruding into the receiving slot 1106 from a bottom inner surface of the receiving slot 1106.

Referring to FIGS. 3-8, the second housing 2 presents as L-shaped and is assembled to the first housing 1 along the back to front direction. The second housing 2 has a second base 21 and a second tongue 22 extending forwardly from a top end of the second base 21. The second base 21 is received in the first retaining room 111, and the second tongue 22 extends into the cavity 123 to joint with the first tongue 12 for making an integral tongue plate of the connector 100. The integral tongue plate defines a volume which is same to that of the first tongue 12. The second base 21 has a front wall 212, a rear wall 213, and a pair of hooks 211 extending outwardly from two sides thereof respectively to lock with the fastening recesses 1191. The front wall 212 defines a plurality of first grooves 214 extending therethrough along the up to down direction to retain the second contacts 4. The rear wall 213 also defines a plurality of second grooves 215 extending therethrough along the up to down direction to retain the first contacts 3. The second housing 2 is formed with a pair of blocks 227 extending along the front to back direction at two sides thereof to be fastened within the accumbent U-shape grooves 127 respectively. The blocks 227 defines a thickness which is smaller than that of the second tongue 22 to make two sides of the second housing 2 present as a step.

The second tongue 22 has a second upper surface 221 and a second bottom surface 222 at upper and lower sides thereof respectively. The second tongue 22 defines a plurality of first slots 224 downwardly recessed from the second upper surface 221 and a plurality of second slots 225 downwardly recessed from the second bottom surface 222. The first slots 224 backwardly extend through the second tongue 22 along the front to back direction and communicate with the second grooves 215 along the up to down direction. A front end of the first slots 224 are stopped by a front end of the second tongue 22 and do not open forwardly. The second slots 225 extend through the second tongue 22 along the front to back direction and communicate with the first grooves 214 along the up to down direction. The second slots 225 open forwardly and downwardly. The second tongue 22 defines a plurality of indentations 226 recessed backwardly from a front end surface thereof. The indentations 226 are aligned with the second slots 225 and communicate with the second slots 225 along the up to down direction. Besides, the indentations 226 are aligned with the recesses 124 along the front to back direction.

The first contacts 3 are USB 2.0 contacts which can mate with the standard USB 2.0 plug to transmit USB 2.0 signals. All the first and second contacts 3, 4 are formed as USB 3.0 contacts which can mate with the standard USB 3.0 plug to transmit USB 3.0 signals. Each first contact 3 has a L-shaped first securing portion 31, an elastic first contact portion 32 extending forwardly and upwardly from a front end of the first securing portion 31, and a first tail portion 33 extending downwardly out of the second housing 2 from a lower end of the first securing portion 31 to connect the circuit board. The first securing portion 31 has a first level portion 311 extending horizontally and a first vertical portion 312 extending vertically. The first level portions 311 are retained in a rear side of the first slots 224. The first vertical portions 312 are retained in the second grooves 215. The first lever portions 311 and the first vertical portions 312 are formed with a plurality of agnails 313 at two sides thereof to engage with inner side walls of the first slots 224 and the second grooves 215. The first contact portions 32 are cantileveredly received in a front side of the fist slots 224 and protrude out of the second upper surface 221.

Each second contact 4 has a L-shaped second securing portion 41, a connecting portion 44 bending upwardly from a front end of the second securing portion 41, a flat second contact portion 42 extending forwardly from a top end of the connecting portion 44, and a second tail portion 43 extending downwardly out of the second housing 2 from a lower end of the second securing portion 41 to connect the circuit board. The second securing portion 41 has a second level portion 411 extending horizontally and a second vertical portion 412 extending vertically. The second level portions 411 are retained in the second slots 225. The second vertical portions 412 are retained in the first grooves 214. The second lever portions 411 and the first vertical portions 412 are formed with a plurality of agnails at two sides thereof to engage with inner side walls of the second slots 225 and the first grooves 215. The connecting portions 44 are retained in the indentions 226 and sandwiched between a front inner wall of the cavity 123 and the front end of the second tongue 12. The second contact portions 42 extend beyond a front end of the second tongue 22 to be received in the recesses 124 of the first tongue 12. An arrangement of all the first and second contact portions 32, 42 on the integral tongue plate is compatible to a standard USB 3.0 connector (not shown).

The optical module 5 is retained in the second retaining room 112. The optical module 5 has a body portion 51 and a mating portion 52 extending forwardly from the body portion 51. The body portion 51 defines two pairs of receiving holes 511 for receiving a pair of fibers (not shown) to transmit optical signals, thereby the connector 100 would have a high signal transmission speed. The body portion 51 has a pair of flexible arms 512 at two sides thereof and a pair of guiding blocks 513 at a lower side thereof to engage with the tracks 1171 of the partition board 117. The arms 512 has a plurality of locking portions 5121 extending outwardly to lock with the clasp portions 1193 in the second retaining room 112 for stably fastening the optical module 5 into the second retaining room 112. The mating portion 52 has two pairs of lens 521, a positioning recess 522 between two pairs of the lens 521 and a pair of posts 523 at two sides of the lens 521. The positioning recess 522 engages with the stopping portion 113. The lens 521 are located behind the front surface 110 of the first base 11 and expose to the receiving space 60 to receive or transmit optical signals. The posts 523 forwardly protrude out of the front surface 110 of the first base 11 to mate with a pair of holes of the optical plug (not shown).

The metal shell 6 covers the first and second housings 1, 2 and forms the receiving space 60 with the first and second tongues 12, 22. The metal shell 6 has a top wall 61, a bottom wall 62, and a pair of side walls 63 connecting the top and bottom walls 62. The top wall 61, bottom wall 62 and side walls 63 have a plurality of spring arms 6 extending forwardly to fasten the corresponding plug respectively. The assistant board 13 is located below the bottom wall 62 and upwardly supports the bottom wall 62 for preventing the metal shell 6 from being distorted. The top wall 61 has a pair of apertures 614 at a rear end thereof to engage with the projections 114 of the first base 11 for preventing the metal shell 6 from moving backwardly. Each side wall 63 defines an opening 635 at a rear side thereof and a mounting leg 632 extending downwardly from a lower end thereof. The protrusions 115 are melted into the openings 635 via a high heat. Therefore, there is not any slits between the protrusions 115 and openings 635, then the first housing 1 can be closely positioned in the metal shell 6. The mounting leg 632 has a retention strip 633 projecting outwardly to make the connector 100 position to the circuit board stably. The bottom wall 62 has an extending portion 620 extending backwardly from a rear end thereof to being received into the receiving slot 1106. The protruding portions 1107 upwardly resist to a lower side of the extending portion 620 for preventing the metal shell 6 from shaking. Each side wall 63 has a barb 636 at a rear end thereof to lock with the cutout 1193.

In assembly, firstly, assembling the first and second contacts 3, 4 to upper and lower sides of the second housing 2 respectively; secondly, assembling the second housing 2 and the first and second contacts 3, 4 to the first housing 1 along the back to front direction; at this time, the second base 21 is received in the first retaining room 111, the hooks 211 are fastened in the fastening recesses 1191 to prevent the second housing 2 from moving along the front to back direction; the second tongue 22 extends into the cavity 123 along the U-shape grooves 127, then the blocks 227 of the second tongue 22 are received in the U-shape grooves 127 and warded off by the first tongue 11 and the resisting walls 126 along the up to down direction; the second upper surface 221 is coplanar with the first upper surface 121; the second contact portions 42 are received into the recesses 124 and only expose to exterior upwardly, and the connecting portions 44 are sandwiched between the first tongue 12 and the front end of the second tongue 22 along the front to back direction. A rear side of the second tongue 22 is received in the first retaining room 111 and warded off by the partition board 117 and lower inner wall of the retaining room 11 along the upper to down direction. Thirdly, assembling the optical module 5 into the second retaining room 112 along the front to back direction; and finally, enclosing the first and second housing 1, 2 by the metal shell 6.

As fully described above, the second housing 2 is assembled to the first housing 1 along the back to front direction; the second tongue 22 is retained in the cavity 123 of the first tongue 12; and a front end surface of the first tongue 12 is located at front of a front end of the second tongue 22 along the front to back direction; therefore, the corresponding plug only can contact with the front end of the first tongue 12 at an initial time, and not contact with the front end of the second tongue 22. Then the second tongue 12 will not be resisted to be separated from the first tongue 12. In addition, a long extending length of the U-shaped slots 127 and the corresponding blocks 227, a warding off structure of the partition board 117 to the second tongue 22 along the up to down direction, and the hooks 211 and fastening recesses 1191, can assure a stably structure between the first and second housings 1, 2.

It is to be understood, however, that even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

We claim:

1. A connector defining a receiving space for receiving a corresponding plug, comprising:
   a first housing having a first base and a first tongue forwardly extending into the receiving space, the first tongue defining a cavity;
   a second housing having a second tongue received in the cavity;
   a plurality of contacts retained on the second housing, the contacts having a plurality of first contacts and a plurality of second contacts set on two opposite sides of the second housing respectively, each first contact having an elastic first contact portion located at a front end of the second tongue, each second contact having a flat second contact portion forwardly extending beyond the second tongue to be hold by the first tongue.

2. The connector as claimed in claim 1, wherein one surface of the second tongue faces to the receiving space, and an opposite surface is covered by the first tongue.

3. The connector as claimed in claim 2, wherein an outer surface of the first tongue is coplanar to the one surface of the second tongue, the cavity is recessed from said outer surface of the first tongue.

4. The connector as claimed in claim 3, wherein the first tongue is formed with a plurality of recesses at a front side of the cavity and a plurality of ribs between adjacent two recesses, and the recesses define a lower inner wall which is higher than that of the cavity, said flat second contact portions of the second contacts are received in the recesses, respectively.

5. The connector as claimed in claim 4, wherein the first tongue has a pair of resisting walls extending into the cavity from two opposite sides of cavity to form a pair of accumbent U-shaped grooves on the two opposite sides of the cavity, respectively, the second tongue is formed with a pair of blocks inserting into the U-shaped grooves along a back to front direction which is opposite to the front to back direction.

6. The connector as claimed in claim 1, wherein the cavity backwardly extends through the first base to form a first retaining room in the first base, the second housing has a second base behind the second tongue retained in the first retaining room, and the first base defines a pair of fastening recesses at two inner side walls of the first retaining room respectively and communicating with the first receiving room along a transverse direction, the second base has a pair of hooks at two sides thereof to engage with the fastening recesses for preventing the second housing from moving along the back to front direction.

7. The connector as claimed in claim 6, wherein the second tongue extends forwardly from a top end of the second base to make the second housing present as L-shaped, the second tongue defines a plurality of first slots at an outer side thereof to receive the first contacts and a plurality of second slots at an inner side thereof to receive the second contacts, and the second base has a plurality of first grooves corresponding to the second slots at a front side thereof and a plurality of second grooves corresponding to the first slots at a rear side thereof.

8. The connector as claimed in claim 7, wherein the first contact has a L-shaped first securing portion with a first level portion retained in a rear side of the first slot and a first vertical portion retained in the second grooves, and each second contact has a L-shaped second securing portion with a second level portion retained in the second slots and a second vertical portion retained in the first groove.

9. The connector as claimed in claim 8, wherein the second tongue further defines a plurality of indentions on a front end surface thereof, and the indentions are forwardly aligned with the recesses and backwardly aligned with the second slots.

10. The connector as claimed in claim 9, wherein the first contact portion extends upwardly and forwardly from a front end of the first securing portion to be cantileveredly received in the first slot, the second contact further has a connecting portion extending upwardly from a front end of the second securing portion to be retained in the indentions and disposed between a front inner wall of the cavity and the front end of the second tongue, and the second contact portion extends horizontally from a top end of the connecting portion.

11. The connector as claimed in claim 9, wherein the second tongue joints with the first tongue to form an integral tongue plate, and an arrangement of all the first and second contact portions on the integral tongue plate is compatible to that of a standard USB 3.0 connector.

12. A connector defining a receiving space for receiving a corresponding plug, comprising:
    a first housing having a first base and a first tongue forwardly extending into the receiving space;
    a second housing retained to the first housing, the second housing having a second tongue forwardly extending into the receiving space, the first and the second tongues substantially stacked with each other along a thickness direction of the first tongue to form an integral tongue plate; and
    a plurality of contacts retained in the first housing and the second housing;
    wherein a front end surface of the second tongue is hidden behind a front region of the first tongue along a front-to-back direction.

13. The connector as claimed in claim 12, wherein the first tongue defines a cavity, the second tongue is received in the cavity and defines an outer surface which is coplanar to an outer surface of the first tongue.

14. The connector as claimed in claim 12, wherein the first tongue has a pair of resisting walls extending toward each other from two opposite side walls of the cavity to form a pair of accumbent U-shaped grooves, the second tongue is formed with a pair of blocks at two sides thereof to insert into the U-shaped grooves along a back to front direction to keep the second tongue in the cavity along the thickness direction.

15. The connector as claimed in claim 12, wherein the cavity backwardly extends through the first base to form a first retaining room in the first base, the second housing has a second base behind the second tongue to be retained in the first retaining room, the first base defines a pair of fastening recesses at two inner side walls of the first retaining room respectively and communicating with the first receiving room along a transverse direction, the second base has a pair of hooks at two sides thereof to engage with the fastening recesses for preventing the second housing from moving along the back to from direction.

16. The connector as claimed in claim 12, further comprising an optical module retained in the first housing, the first base has a second retaining room extending therethrough, the optical module is retained in the second retaining room and forwardly exposed to the receiving space.

17. An electrical connector comprising:
    a primary insulative housing defining a first main body with a first mating tongue extending forwardly from the first main body;
    a cavity formed in a first face of the first mating tongue;
    a through hole formed in the main body around the first mating tongue;

a secondary insulative housing defining a second main body with a second mating tongue extending forwardly from the second main body;

the secondary insulative housing being forwardly assembled to the primary insulative housing through said through hole from a rear face of the primary insulative housing with the second mating tongue received in the cavity;

a set of first contacts having first retaining sections essentially located adjacent to an interface area between the first mating tongue and the second mating tongue, and stiff first contacting sections essentially located at a front edge region of the first face of the first mating tongue; and a set of resilient second contacts having second retaining sections essentially relative farther from the interface than the first retaining sections, and deflectable second contacting sections behind the stiff first contacting sections.

18. The electrical connector as claimed in claim 17, wherein both said first retaining sections and said second retaining sections are retained to the second housing.

19. The electrical connector as claimed in claim 17, wherein said primary housing further includes another cavity to receive an optical module which is forwardly assembled thereinto.

20. The electrical connector as claimed in claim 17, wherein the first mating tongue includes a pair of resisting walls to form pair of grooves on two sides of the cavity so as to restrain movement of second mating tongue from the cavity in a vertical direction perpendicular to a front-to-back direction.

* * * * *